(12) United States Patent
Kamura

(10) Patent No.: US 8,136,117 B2
(45) Date of Patent: Mar. 13, 2012

(54) INFORMATION PROCESSOR AND INFORMATION PROCESSING SYSTEM

(75) Inventor: Koichiro Kamura, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1006 days.

(21) Appl. No.: 12/100,146

(22) Filed: Apr. 9, 2008

(65) Prior Publication Data

US 2008/0271033 A1  Oct. 30, 2008

(30) Foreign Application Priority Data

Apr. 27, 2007  (JP) ................................ 2007-119837

(51) Int. Cl.
*G06F 9/06* (2006.01)
(52) U.S. Cl. ........................................ 718/104; 709/220
(58) Field of Classification Search .................. None
See application file for complete search history.

(56) References Cited

U.S. PATENT DOCUMENTS

| | | | |
|---|---|---|---|
| 7,421,533 B2* | 9/2008 | Zimmer et al. | 711/6 |
| 7,469,346 B2* | 12/2008 | Watson | 713/193 |
| 7,802,250 B2* | 9/2010 | Uhlig et al. | 718/1 |
| 8,015,563 B2* | 9/2011 | Araujo et al. | 718/1 |
| 2003/0145210 A1 | 7/2003 | Taylor | 713/182 |
| 2003/0204708 A1* | 10/2003 | Hulme et al. | 713/1 |
| 2004/0064618 A1* | 4/2004 | Farrell et al. | 710/200 |
| 2005/0155011 A1* | 7/2005 | Heik et al. | 717/100 |
| 2005/0251802 A1* | 11/2005 | Bozek et al. | 718/1 |
| 2006/0070066 A1* | 3/2006 | Grobman | 718/1 |
| 2007/0067435 A1* | 3/2007 | Landis et al. | 709/224 |

FOREIGN PATENT DOCUMENTS

| | | |
|---|---|---|
| JP | 2000-112720 | 4/2000 |
| JP | 2000-311080 | 11/2000 |
| JP | 2000-322146 | 11/2000 |
| JP | 2001-318797 | 11/2001 |
| JP | 2003-280915 | 10/2003 |
| JP | 2007-026412 | 2/2007 |

OTHER PUBLICATIONS

Japanese Office Action dated May 10, 2011.

* cited by examiner

*Primary Examiner* — Eric Coleman
(74) *Attorney, Agent, or Firm* — Pillsbury Winthrop Shaw Pittman, LLP

(57) ABSTRACT

An information processing apparatus is disclosed in which software resources are divided into first through N-th groups each of which has an operating system, a program operating on the operating system, and data, includes an execution section configured to simultaneously execute the groups with the groups isolated from one another, an OS activating section configured to operate on the operating system of the first group and activate the operating system of at least one of the second through N-th groups according to activation information, an activation information changing section configured to make communication with an administrative server over a network and change the activation information in response to an instruction from the administrative server, and a lock section configured to disable the operating system and the program of each of the second through N-th groups to change the activation information.

17 Claims, 18 Drawing Sheets

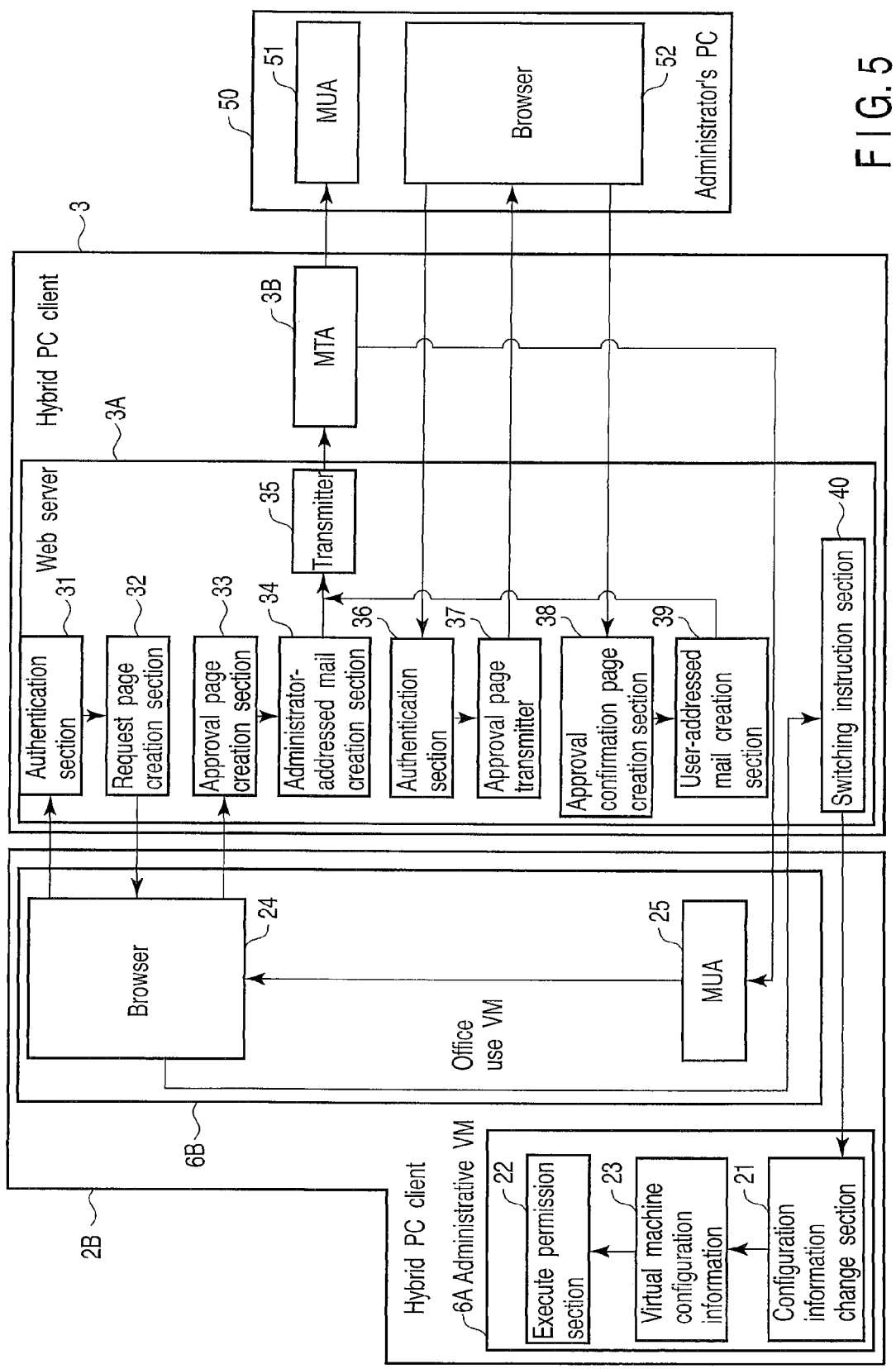
F I G. 5

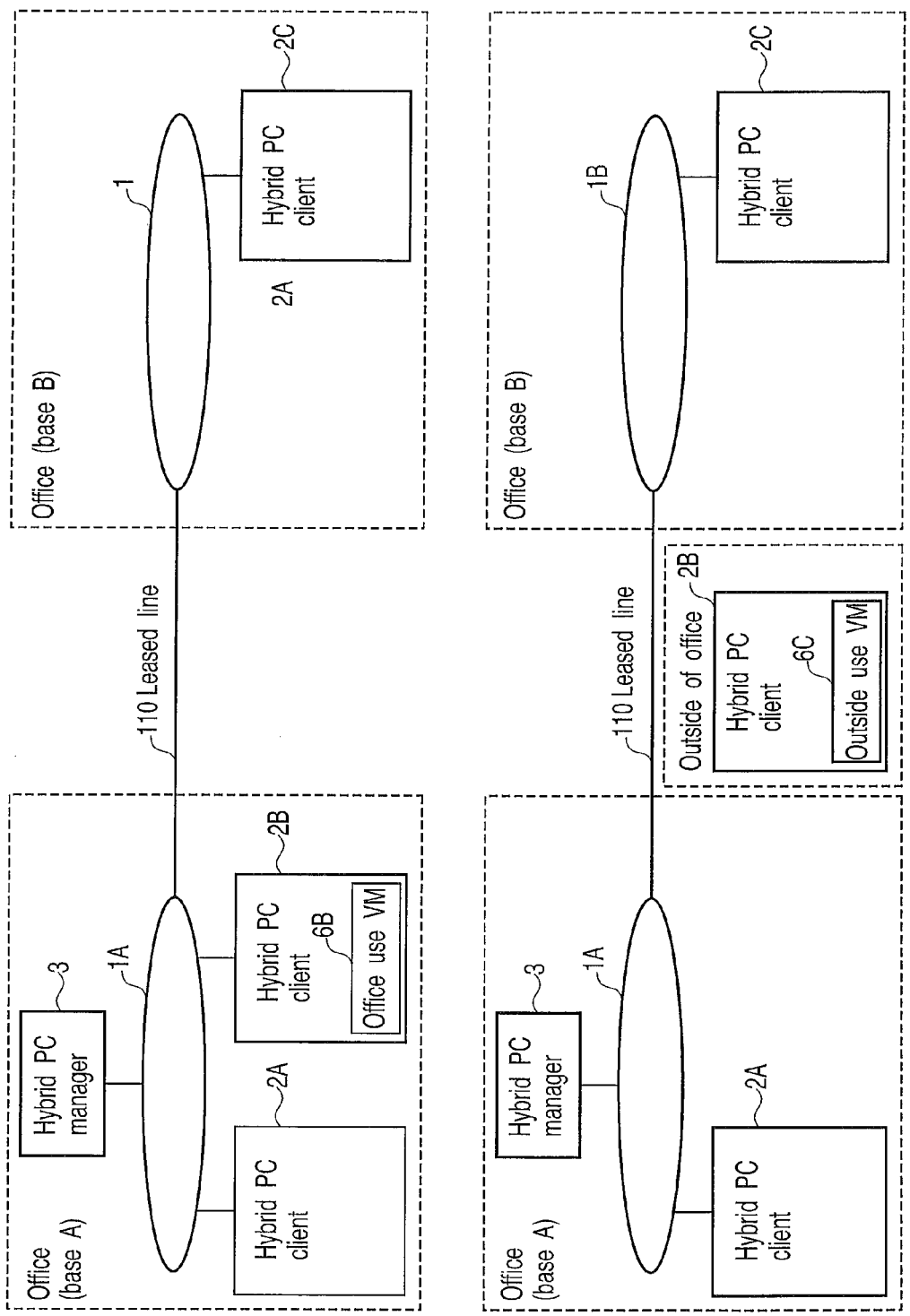
F I G. 16
F I G. 17

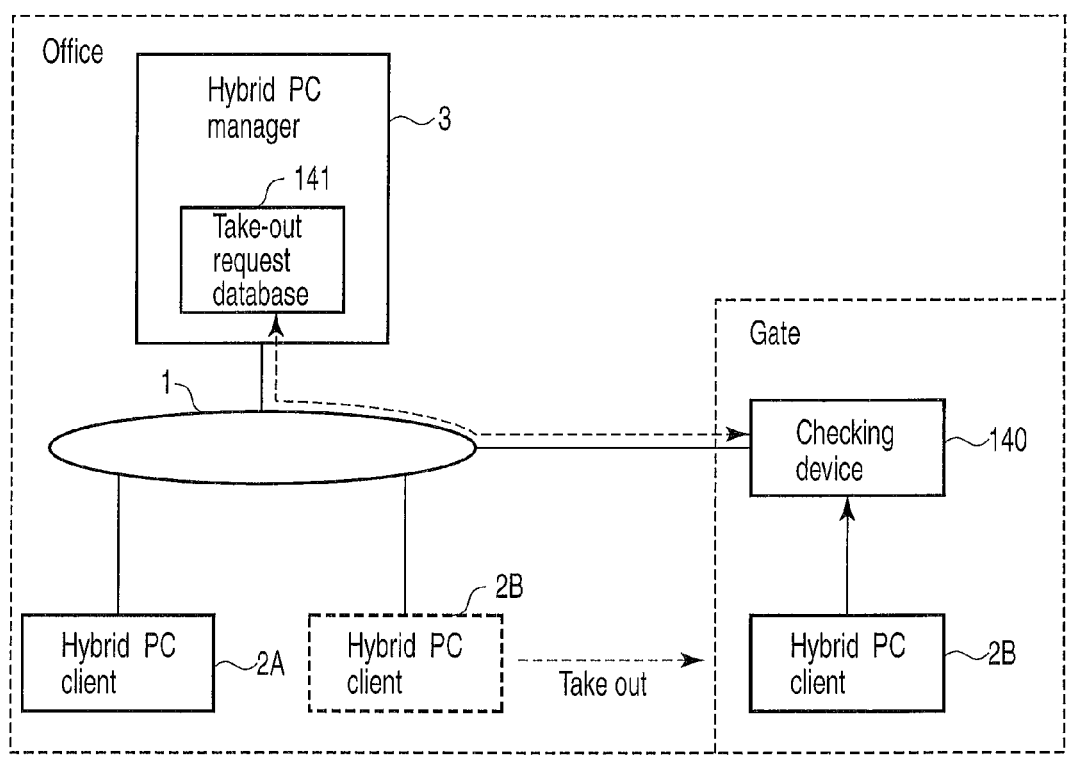
F I G. 21

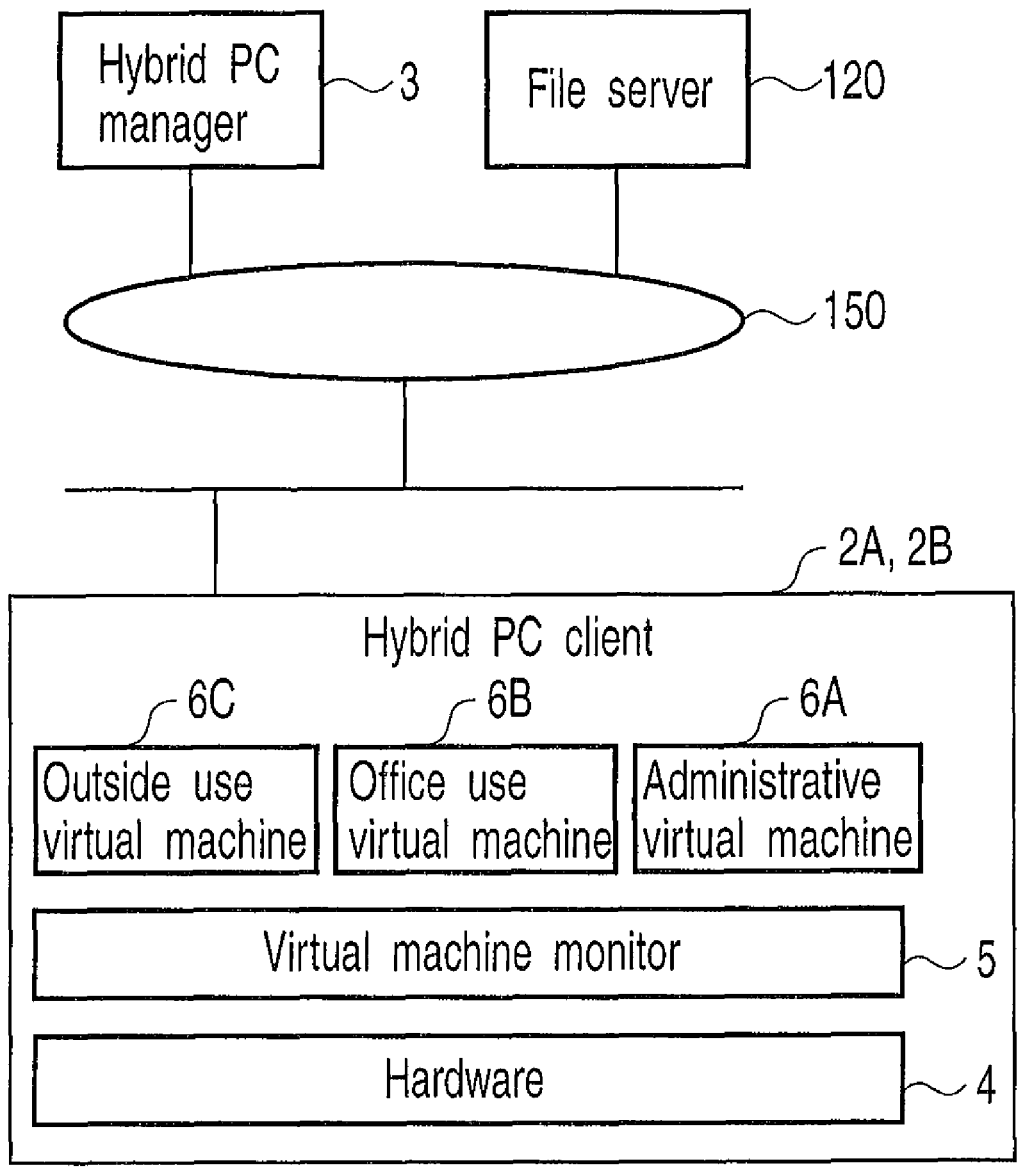
F I G. 22

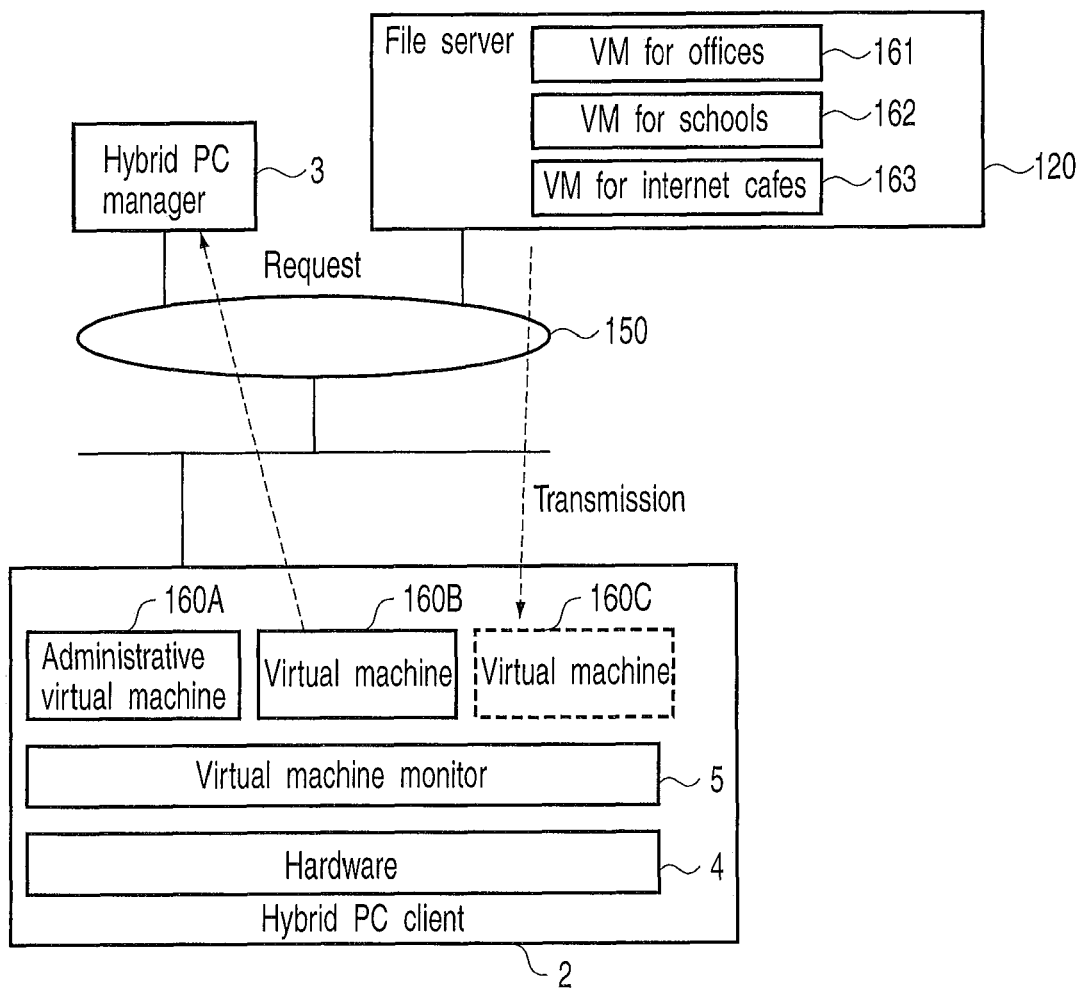
F I G. 23

INFORMATION PROCESSOR AND INFORMATION PROCESSING SYSTEM

CROSS-REFERENCE TO RELATED APPLICATIONS

This application is based upon and claims the benefit of priority from Japanese Patent Application No. 2007-119837, filed Apr. 27, 2007, the entire contents of which are incorporated herein by reference.

BACKGROUND

1. Field

One embodiment of the invention relates to an information processor which is capable of changing the environment according to places where it is operated and an information processing system.

2. Description of the Related Art

Heretofore, measures taken against information leakage through outside of office use of personal computers include the following ones:

1. Utilization of thin clients (personal computers with no hard disks).

2. Utilization of personal computers for outside use only (with no encryption software and confidential information).

However, the utilization of thin clients involves introduction of a large-scale system. In addition, there are drawbacks that personal computers cannot be used where access to a server cannot be made and, when the loading of a network is high, the speed of response decreases. When personal computers for outside use only are used for measures against leakage of information, the introduction of such personal computers will cost a great deal if many staff members of a company go out on business. At present, it is very difficult to rigorously enforce operating rules such that no data should be retained in personal computers for outside use only and, in case where data have been retained, the borrower should erase that data when he or she returns the personal computer.

In JP-A No. 2003-311080 (paragraphs 0007, 0008 and 0012), a computer system is described which retains a plurality of pieces of environment setting information and, upon receipt of a request from a user to switch environments, sets up its operating environment on the basis of the retained setting information.

When the staff members want to take out their usual personal computers, there would arise the following problems:

1. It is troublesome for a user to erase data in a personal computer or move it to a server when he or she goes out.

2. There is a worry that confidential information may be taken out due to carelessness.

3. It is troublesome for a user to restore the environment (data and settings) to the original state when he or she takes a personal computer back (at present, this is not enforced rigorously).

4. There is a worry that important data may be lost when a personal computer is missing.

5. There is a worry that confidential information may leak out as a result of being infected with computer viruses in a place to which a staff member goes out.

6. The preparation of personal computers for outside use only costs a great deal.

7. If staff members are prohibited from taking out their usual computers even when they go out to different divisions in the same company, they will suffer much inconvenience (in such a case, they will want to work on their usual personal computers in the same company).

It should be noted that in order to work at home, there is available a software product which allows virtual machine images used office to be installed in a personal computer used at home. This product allows a user himself or herself to switch between virtual machines. For this reason, confidential information or data might be copied into the personal computer used at home.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is an exemplary schematic diagram showing the configuration for switching virtual machines according to the first embodiment;

FIG. 16 show an exemplary usage of a hybrid PC system according to a second embodiment;

FIG. 17 show an exemplary usage of a hybrid PC system according to a second embodiment;

FIG. 21 is an exemplary schematic diagram for use in explanation of examination when a hybrid PC client is taken out according to a fourth embodiment;

FIG. 22 is an schematic diagram showing a hybrid PC client and a hybrid PC manager which are connected together through the Internet; and FIG. 23 shows an exemplary usage of a hybrid PC system.

DETAILED DESCRIPTION

Various embodiments according to the invention will be described hereinafter with reference to the accompanying drawings. In general, according to one embodiment of the invention, an information processing apparatus in which software resources are divided into first through N-th groups each of which has an operating system, a program operating on the operating system, and data, comprises an execution section configured to simultaneously execute the operating system and the program of each of the groups with the groups isolated from one another, an OS activating section configured to operate on the operating system of the first group and activate the operating system of at least one of the second through N-th groups according to activation information, an activation information changing section configured to make communication with an administrative server over a network and change the activation information in response to an instruction from the administrative server, and a lock section configured to disable the operating system and the program of each of the second through N-th groups to change the activation information.

The embodiments of the present invention will be described hereinafter with reference to the accompanying drawings.

First Embodiment

Figure 1:
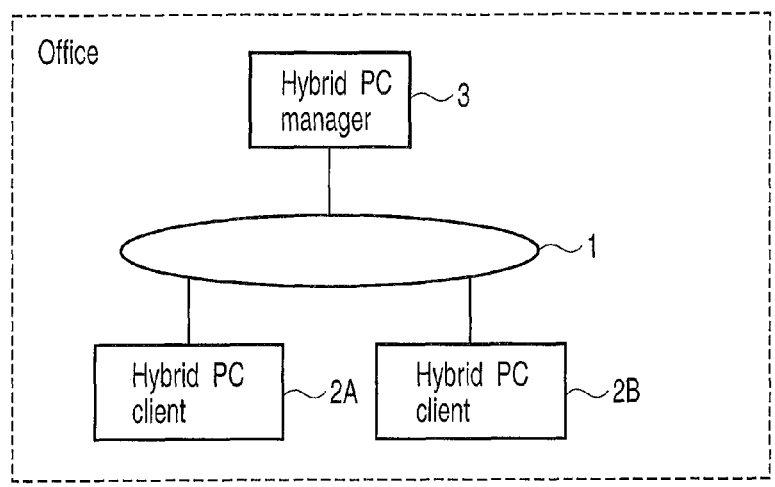
FIG. 1 is an exemplary schematic block diagram showing the configuration of a hybrid PC system as an information processing system according to the first embodiment.
Figure 2:
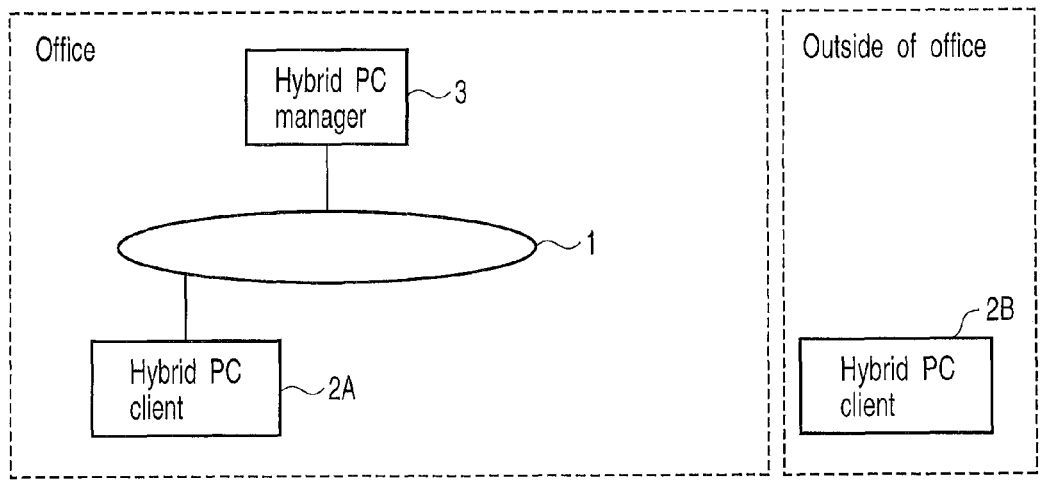
FIG. 2 is an exemplary schematic block diagram showing the configuration of a hybrid PC system as an information processing system according to the first embodiment.

FIGS. 1 and 2 show the configuration of a hybrid PC system according to a first embodiment of the invention. As shown in FIG. 1, a plurality of hybrid PC clients 2A and 2B and at least one hybrid PC manager 3 are connected to an office LAN 1. The hybrid PC clients 2A and 2B are personal computers which are used by staff members of a company. The hybrid PC manager is a personal computer or server which is used by an administrator, such as an IT equipment administrator or a person in charge of a section.

A first objective of the hybrid PC system according to the invention is to provide an information communication infrastructure which allows the staff members to take their accustomed hybrid PC clients 2A and 2B to outside of their office without worry and sacrificing convenience.

With this system, before a staff member takes the hybrid PC client to outside of the office, he or she makes a request to the hybrid PC manager via the system for permission to take the PC client out. When permission is granted, as shown in FIG. 2, the hybrid PC manager switches the environment of that hybrid PC client available to the staff member to one for outside use. When the staff member takes the PC client back to the office and then makes a request to that effect, the hybrid PC manager restores the environment of the hybrid PC client to the one for office use.

Companies which introduce the inventive hybrid PC system provide their staff members (users) with hybrid PC clients which have three types of virtual machines installed, which are to be described below.

Figure 3:
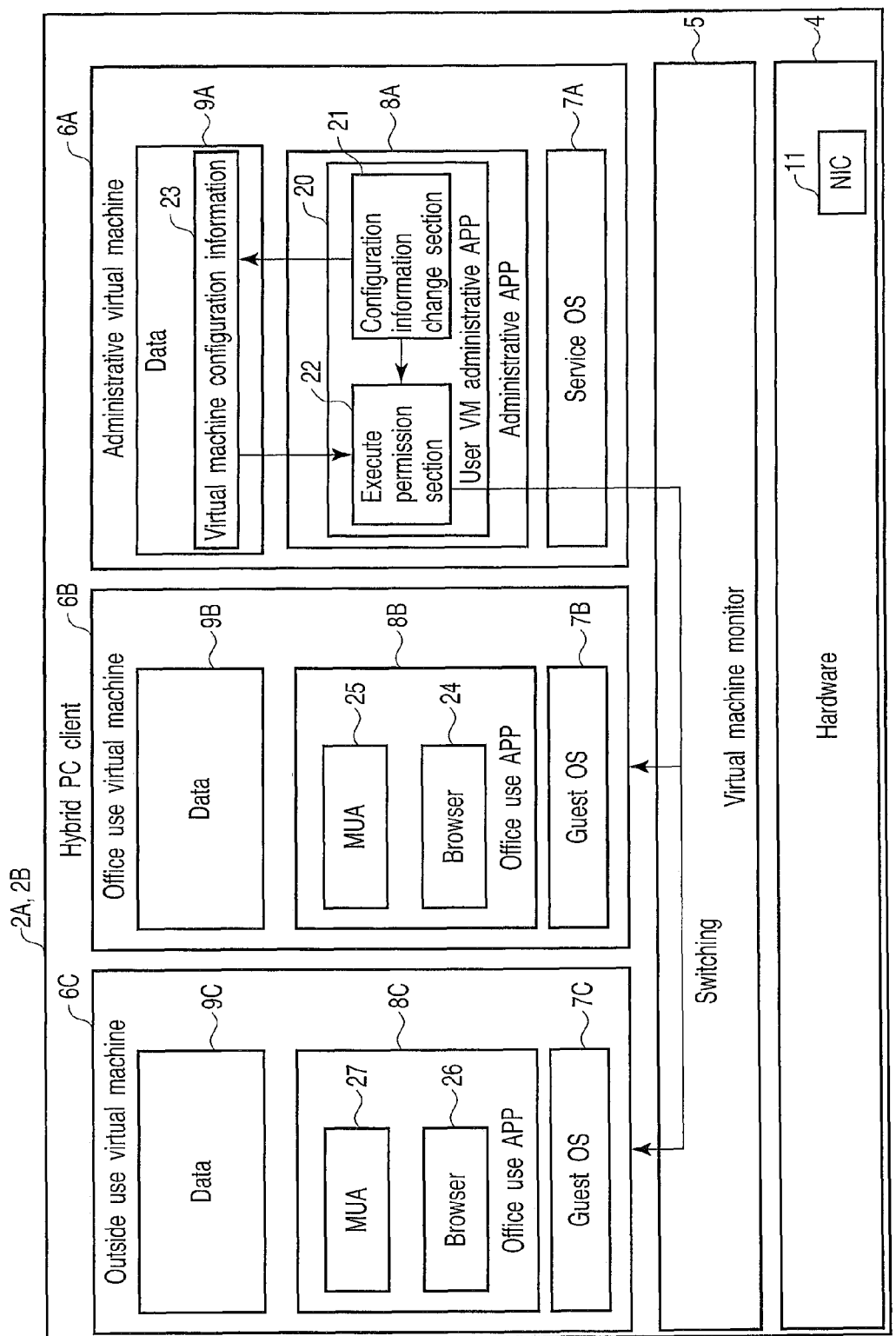
FIG. 3 is an exemplary schematic block diagram showing the configuration of a hybrid PC client as an information processor according to the first embodiment.

FIG. 3 shows the configuration of a hybrid PC client according to the first embodiment of the invention. The hybrid PC client 2A (2B) is composed of hardware 4, a virtual machine monitor 5, and a plurality of virtual machines (software resources) 6A, 6B and 6C. Each of the virtual machines contains an operating system (OS), applications, and data and operates as if it were a personal computer.

The administrative virtual machine 6A is composed of an administrative service operating system (OS) 7A, administrative applications (APP) 8A, and a data area 9A. The administrative virtual machine 6A is privileged to create or delete the office use virtual machine 6B and the outside use virtual machine 6C, make them available or unavailable, and set up parameters, such as disk capacity, memory capacity, CPU allocation, etc. The administrative virtual machine 6A is available to the administrator alone (that is, this machine is not available to staff members (users)).

The administrative applications 8A include a user virtual machine (VM) administrative application (APP) 20. The user VM administrative application 20 is an application which, as instructed by the hybrid PC manager 3, switches the user virtual machine to be implemented from one of the office use virtual machine 6B and the outside-use virtual machine 6C to the other. The user VM administrative application 20 includes a configuration information change section 21 and an execution permission section 22.

The configuration information change section 21 has a function of changing virtual machine configuration information 23 within the data area 9A. The virtual machine configuration information 23 has information as to which of the office use virtual machine 6B and the outside-use virtual machine 6C is to be implemented. The execution permission section 22 refers to the virtual machine configuration information 23 at system startup to permit the execution of one of the virtual machines 6B and 6C. The service operating system 7A limits access to the virtual machine configuration information 23 by guest OSs 7B and 7C and the applications 8B and 8C of the virtual machines 6B and 6C, thereby making it impossible for the guest OSs 7B and 7C and the applications 8B and 8C to change the virtual machine configuration information 23.

The office use virtual machine 6B has the guest operating system (OS) 7B which is used inside the office, office use applications (APP) 8B, and a data area 9B containing confidential data. The office use applications 8B include a Web browser 24 and a mail user agent (MUA) 25.

The outside-use virtual machine 6C which is used outside the office includes the guest operating system (OS) 7C used outside, the outside use applications (APP) 8C, and a data area 9C containing data except confidential data. The outside-use applications 8C include a Web browser 26 and a mail user agent (MUA) 27. When the outside-use virtual machine 6C is being executed, operations of writing into an external recording device, printing, and the like are restricted.

The hardware 4 is equipped with a network interface card (NIC) 11 adapted to make communications with the hybrid PC manager 3.

The virtual machines 6A, 6B and 6C share one piece of hardware; however, the resources (OS, applications, and data) of each virtual machine are isolated from the other virtual machines so that access to them cannot be made. For this reason, even if the outside-use virtual machine 6B is infected with computer viruses, virus programs cannot access confidential information and data within the office virtual machine 6B, thus allowing the prevention of information leakage due to computer viruses.

Next, a description is given of a process of switching between the virtual machines. When a staff member (user)

takes the hybrid PC client 2B to outside of the office, he or she makes a request for permission to take the personal computer out through the use of an application for PC take-out request installed in the office use virtual machine 6B. The request from the user is presented to his or her superior or the administrator through e-mail or groupware. When the request is granted by the superior or administrator, the hybrid PC manager operates the administrative application 8A in the corresponding hybrid PC client to switch the virtual machine available to the user from the office use virtual machine 6B to the outside-use virtual machine 6C.

Figure 4:
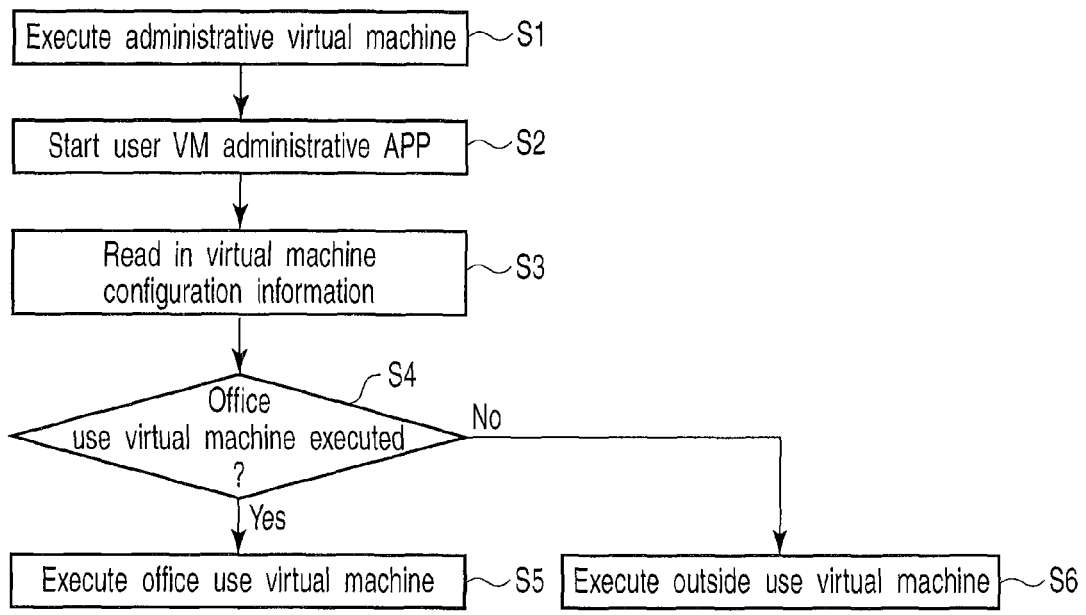
FIG. 4 is an exemplary flowchart illustrating the operation at power-on time of the hybrid PC client according to the first embodiment.

Next, the operation when the power is applied to the hybrid PC client will be described with reference to FIG. 4. When the user turns on the power to the PC client, the administrative virtual machine 6A is executed first (step S1). With the execution of the administrative virtual machine 6A, the service OS 7A starts. Then, the user VM administrative application 20 starts on the service OS 7A (step S2). The execute permission section 22 in the user VM administrative application 20 reads in the virtual machine configuration information 23 (step S3) and then makes a decision of whether or not the virtual machine which has get execute permission is the office use virtual machine 6B (step S4). If it is decided that the office use virtual machine 6B is to be executed (Yes in step S4), then the execute permission section 22 permits the execution of the office use virtual machine 6B and causes it to run. If, on the other hand, it is decided that the office use virtual machine 6B is not to be executed (No in step S4), the execution permission section 22 permits the execution of the outside use virtual machine 6C and causes it to be executed.

Thus, the user virtual machines can be selectively executed according to the virtual machine configuration information 23.

Next, the configuration to switch between the virtual machines will be described with reference to FIG. 5, which shows an example of switching from the office use virtual machine 6B to the outside use virtual machine 6C.

As shown in FIG. 5, the hybrid PC manager 3 includes a Web server 3A and a mail transfer agent (MTA) 3B. The Web server 3A has a user authentication section 31, a request page creation section 32, an approval page creation section 33, a administrator-addressed mail creation section 34, a transmitter 35, an administrator authentication section 36, an approval page transmitter 37, an approval confirmation page creation section 38, an user-addressed mail creation section 39, and a switching instruction section 40.

The user authentication section 31 sends an authentication page having input fields for user ID and password to the browser 24 in the presence of a request for a request Web page from the browser 24. On the basis of the user ID and password from the office use virtual machine 6B the authentication section 31 performs an authentication process of determining whether the person who is operating the virtual machine 6B is an authorized user.

When the user authentication section 31 has identified that person as an authorized user, the request page creation section 32 creates a Web page for the user to make a when the user authentication section 31 has identified that person as an authorized user to the administrator for switching between the virtual machines and then sends it to the browser 24.

The approval page creation section 33 creates an approval Web page when the user has filled in the Web page and sent back it and then uploads the approval Web page. The administrator-addressed mail creation section 34 creates mail addressed to the administrator in which particulars the user has filled in into the request page and URL in the approval Web page are written and then outputs it to the transmitter 35.

The transmitter 35 sends the mail created by the administrator-addressed mail creation section 34 and the user-addressed mail creation section 39 to the mail transfer agent 3B.

The administrator authentication section 36 sends an authentication page having input fields for user ID and password to the browser 52 in the presence of a request for the URL written in the mail addressed to the administrator. On the basis of the user ID and password sent from the administrator PC 50, the administrator authentication section 36 performs an authentication process of determining whether the person who is operating the administrator PC 50 is an authorized user.

When the administrator authentication section 36 has identified that person as an authorized user, the approval page transmitter 37 sends data in the approval Web page created by the approval page creation section 33 to the browser 52.

When the administrator has approved the take-out request through the approval Web page, the approval confirmation page creation section 38 creates an approval confirmation Web page to confirm that the user has been approved and then uploads data.

The user-addressed mail creation section 39 creates mail addressed to the user in which the URL of the approval confirmation Web page is written and then outputs it to the transmitter 35.

Figure 6:
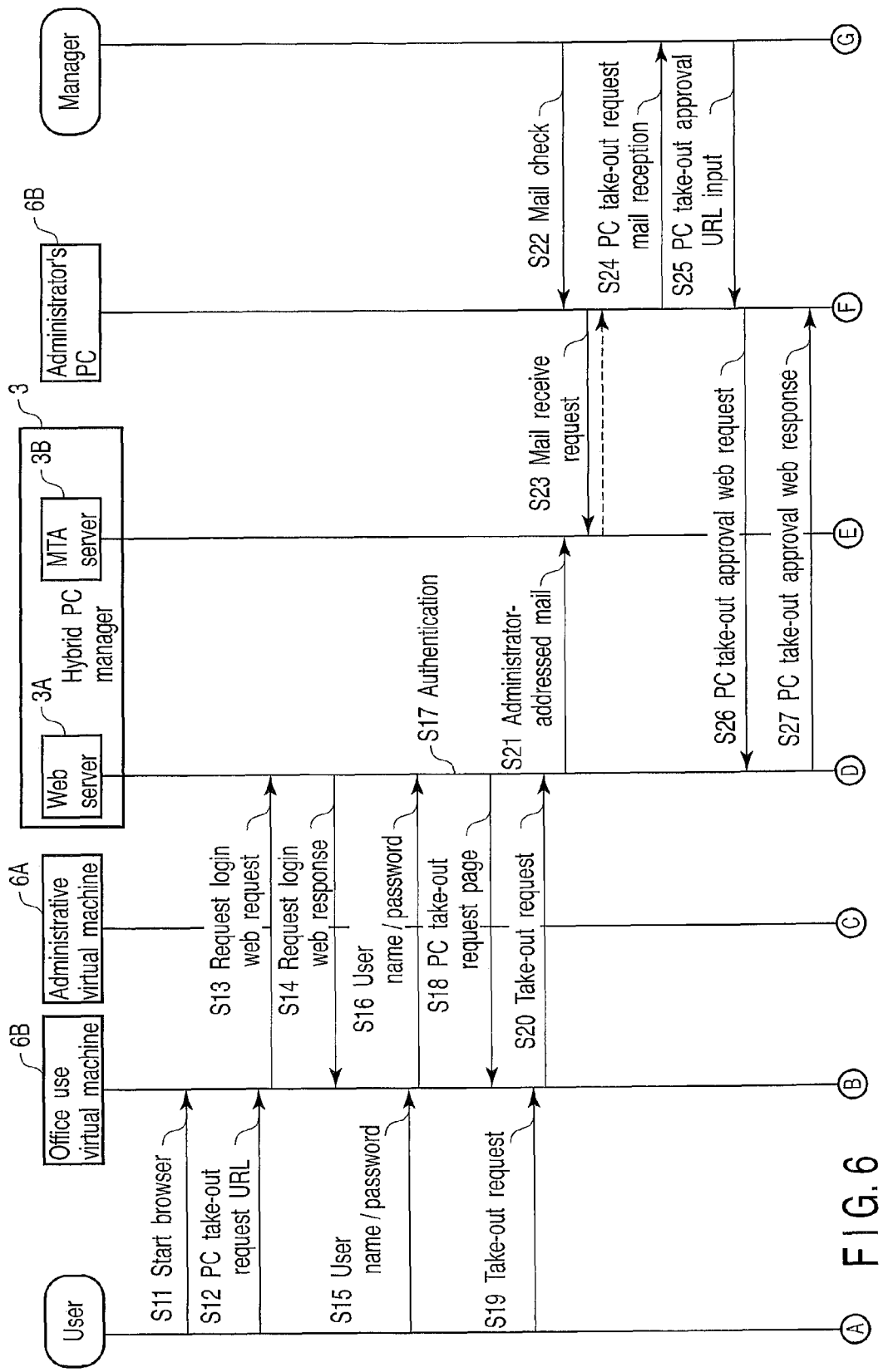
FIG. 6 is an exemplary flowchart illustrating virtual machine switching sequence according to the first embodiment.
Figure 7:
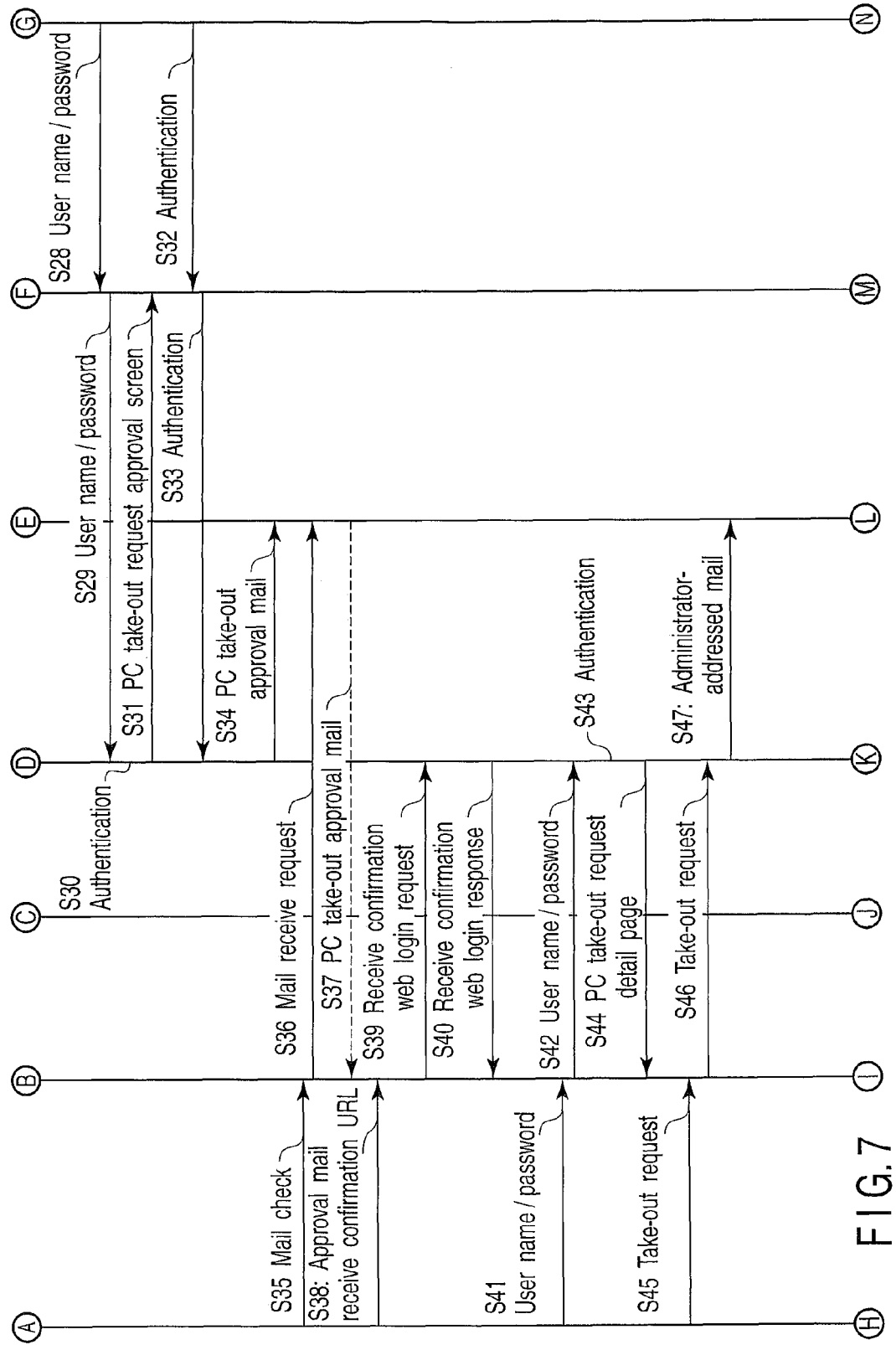
FIG. 7 is an exemplary flowchart illustrating virtual machine switching sequence according to the first embodiment.
Figure 8:
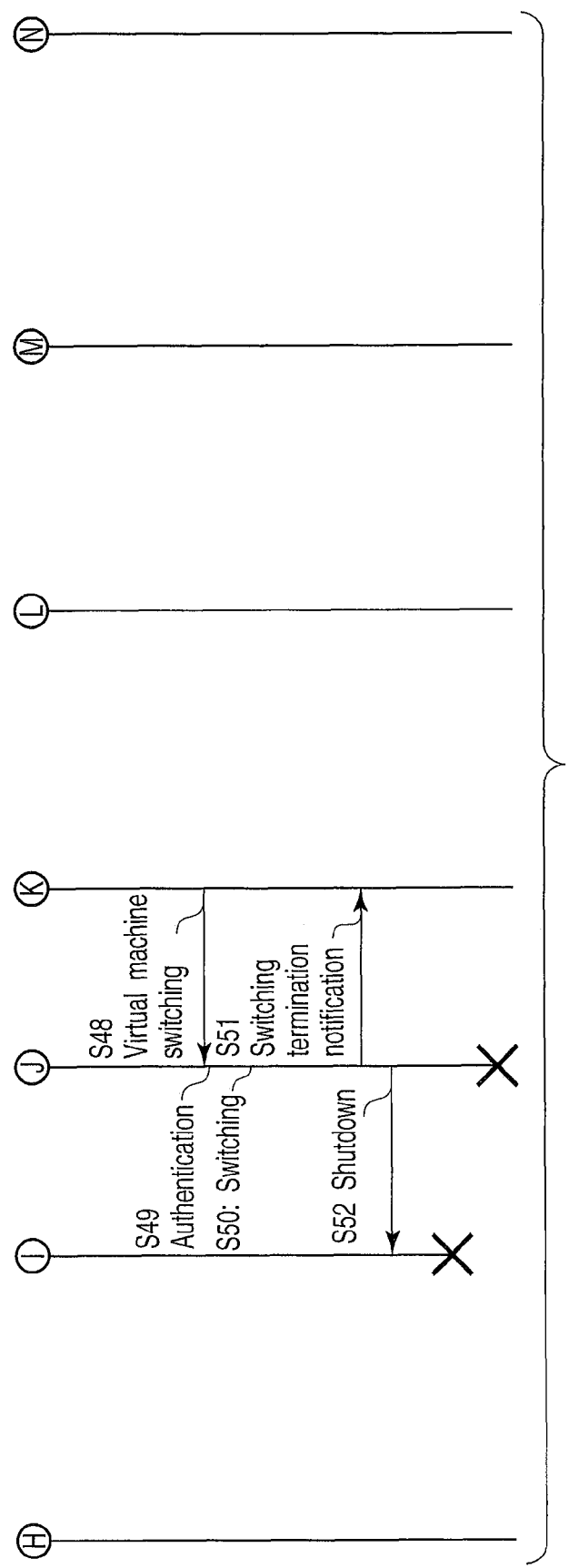
FIG. 8 is an exemplary flowchart illustrating virtual machine switching sequence according to the first embodiment.

Reference is next made to FIGS. 6, 7 and 8 which form a flowchart to describe the user virtual machine switching sequence. This flowchart illustrates communications among a staff member (user), the applications on the office use virtual machine 6B in a personal computer used by the staff member, the administrative virtual machine 6A, the Web server for processing take-out request, the mail server, the administrator's personal computer, and the administrator. The aforementioned hybrid PC manager may take the form of a subsystem which is composed of the Web server and the mail server that are shown in the flowchart.

When making a request for permission to take the personal computer out, the staff member (user) starts the Web browser 24 installed in the office use virtual machine 6B (step S11) and then inputs the URL (uniform resource location) of the take-out request Web server (step S12). The office use virtual machine 6B sends a request for the take-out request Web page from the Web browser 24 to the Web server 3A (step S13).

Figure 9:
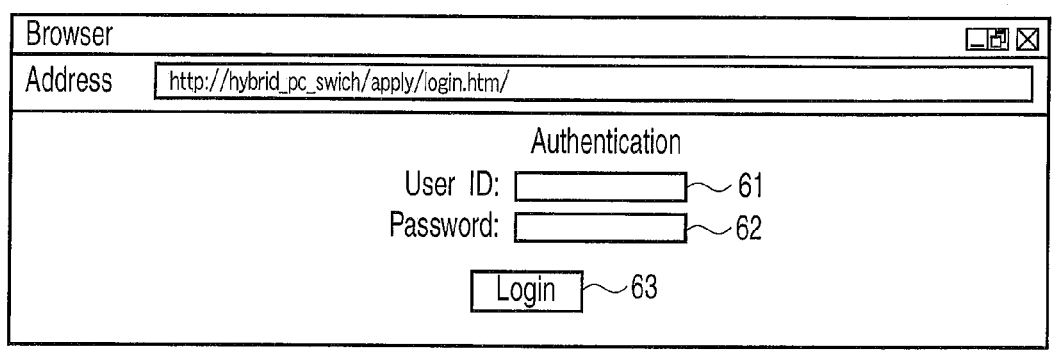
FIG. 9 is an exemplary schematic diagram illustrating a take-out request Web page according to the first embodiment.

The user authentication section 31 in the Web server 3A responds to that request by sending take-out request Web page data to the Web browser 24 (step S14). FIG. 9 shows an example of a take-out request login Web page displayed by the Web browser 24. As shown, the Web page contains an input field for user ID and an input field for password. The staff member enters his or her user ID and password in the input fields 61 and 62, respectively (step S15). When the user presses a login button 63, the Web browser 24 sends the user ID and password entered into the input fields 61 and 62 to the Web server 3A (step S16). After that, the authentication section 31 in the Web server 3A identifies the staff member through the use of the received user ID and password (step S17).

Figure 10:
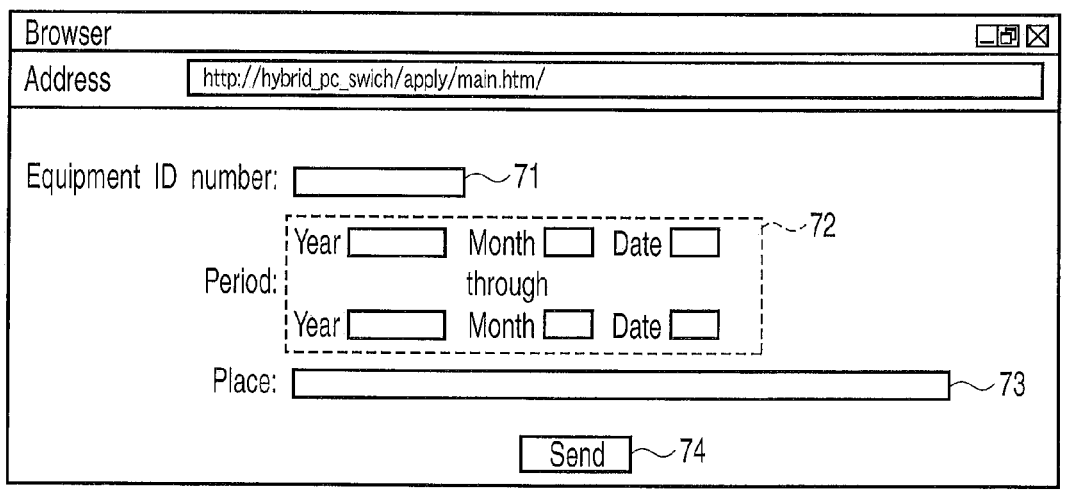
FIG. 10 is an exemplary schematic diagram illustrating a PC take-out request Web page according to the first embodiment.

When the staff member has successfully been identified, the request page creation section 32 sends a PC take-out request page to the Web browser (step S18). An example of a PC take-out request Web page displayed by the Web browser 24 is illustrated in FIG. 10. As shown, the request page contains input fields 71, 72 and 73 for PC take-out information required to make a PC take-out request. The staff member enters the equipment identification number of the personal computer, the period during which he or she will take the computer out, and the location to which he or she takes the computer out in the input fields 71, 72 and 73, respectively (step S19). When the user presses a send button 74, the Web browser 24 sends the PC take-out information entered into the input fields 71, 72 and 73 to the Web server 3A (step S20). The approval page creation section 33 creates an approval Web page used for the administrator to grant or deny the request through the use of the Web browser 52 and then uploads it. The approval Web page contains the PC take-out information from the staff member. The administrator-addressed mail creation section 34 creates mail addressed to the administrator which contains information containing the PC take-out information from the user and the URL of the approval Web page and then outputs it to the transmitter 35. The transmitter 35 sends mail created by the administrator-addressed mail creation section 34 and the user-addressed main creation section 39 to the mail transfer agent 3B and the mail is stored into the mail transfer agent 3B (step S21).

Figure 11:
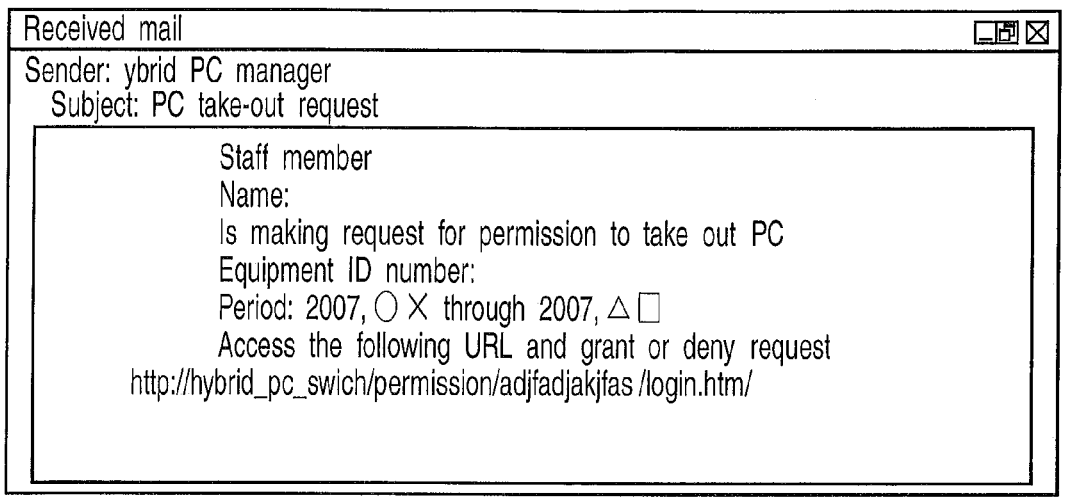
FIG. 11 is an exemplary schematic diagram illustrating mail according to the first embodiment.

When the mail user agent 51 in the administrator PC 50 issues a mail receive request to the mail transfer agent 3B in response to an operation (step S22) by the administrator, PC take-out receive mail is sent from the mail transfer agent 3B to the administrator PC 50 and received by the mail user agent 51 (step S24). An example of electronic mail received by the mail user agent 51 is illustrated in FIG. 11.

When the administrator accesses the URL in the electronic mail (step S25), the URL is passed to the Web browser 52, which in turn issues a request for PC take-out approval Web page to the Web server 3A (step S26).

The Web server 3A responds to that request by sending a PC take-out approval Web page to the browser 52 of the administrator PC 50 (step S27).

Figure 12:
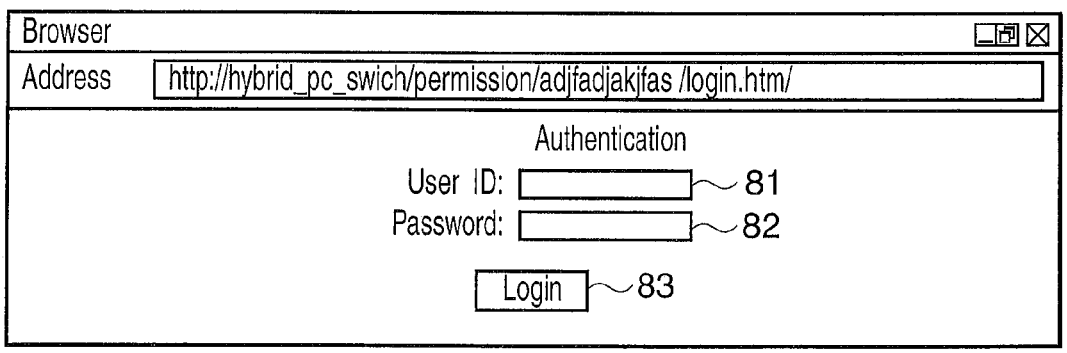
FIG. 12 is an exemplary schematic diagram illustrating an approval login Web page according to the first embodiment.

An example of a take-out approval Web page displayed by the Web browser 24 is shown in FIG. 12. As shown in FIG. 12, the take-out approval Web page contains an input field 81 for user ID and an input field 82 for password. The administrator enters his or her own user ID and password in the input fields 81 and 82, respectively (step S28). When the administrator presses a login button 83, the Web browser 52 sends the user ID and password entered in the input fields 81 and 82 to the Web server 3A (step S29). After that, the authentication section 31 in the Web server 3A identifies the administrator using the received user ID and password (step S30).

When the administrator has been identified successfully, the Web server 3A sends data on a PC take-out request approval Web page created by the approval page creation section 33 to the personal computer of the administrator (step S31).

Figure 13:
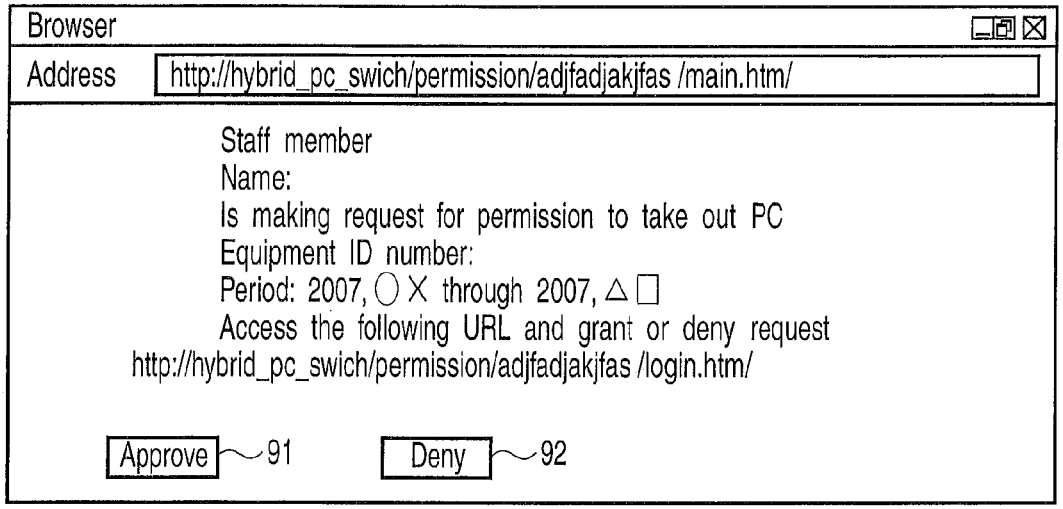
FIG. 13 is an exemplary schematic diagram illustrating a take-out approval Web page according to the first embodiment.

An example of a take-out approval Web page displayed by the Web browser 24 is illustrated in FIG. 13. As shown, the name of the staff member which has made a request for PC take-out and the equipment identification number of the personal computer have been written on the take-out approval page. An approval button 91 and a denial button 92 are set on the take-out approval Web page.

The administrator checks the take-out request approval page to visually confirm the name of the staff member and the equipment identification number of the personal computer and then selects either the approve button 91 or the deny button 92 on the page (step S32). The Web browser 52 sends the result of selection to the Web server 3A (step S33). When approved by the administrator, the approval confirmation page creation section 38 creates a Web page used for the user to confirm the approval by the administrator and then uploads data. The user-addressed mail creation section 39 creates mail addressed to the user on which the URL of the approval conformation page is written and then outputs it to the transmitter 35, which, in turn, sends the electronic mail (take-out approval mail) addressed to the staff member (user) (step S34).

Figure 14:
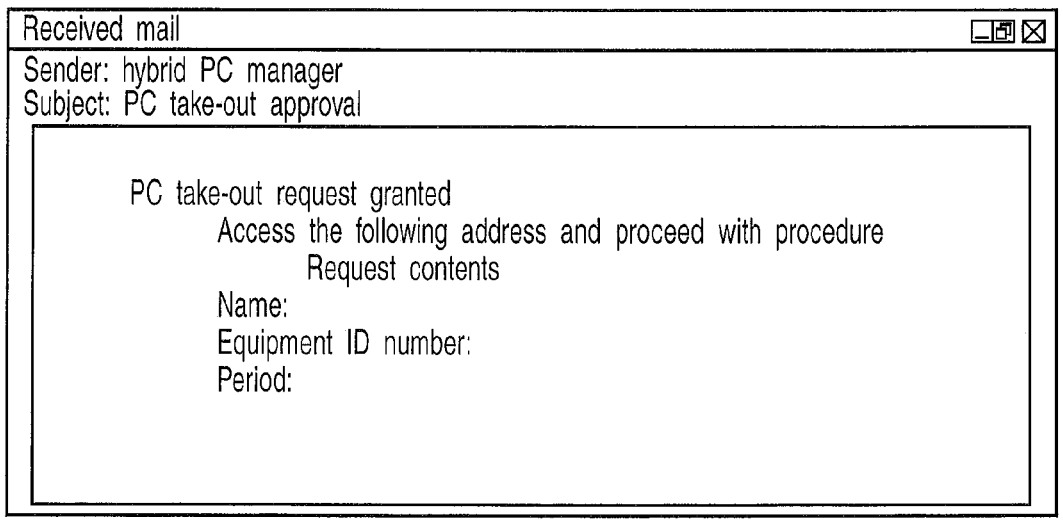
FIG. 14 is an exemplary schematic diagram illustrating mail according to the first embodiment.

When the mail user agent 25 in the office use virtual machine 6B issues a mail receive request to the mail transfer agent 3B in response to an operation by the user (step S35), PC take-out approval confirmation mail is sent from the mail transfer agent 3B to the office use virtual machine 6B (step S36) and received by the mail user agent 25 (step S37). An example of mail received by the mail user agent 25 is illustrated in FIG. 14.

When the administrator accesses the URL in the text of the electronic mail (step S38), the URL is passed to the Web browser 24, which in turn issues a request for a PC take-out approval confirmation login Web page to the Web server 3A (step S39).

The Web server 3A responds to the browser 52 in the administrator PC 50 with the approval confirmation login Web page (step S40). The approval confirmation login Web page is the same as the one shown in FIG. 9 and hence the illustration thereof is omitted.

The staff member (user) inputs his or her own user ID and password into the input fields 61 and 62, respectively (step S41). When the user presses the login button, the Web browser 24 sends the user ID and passwords in the input fields to the Web server 3A (step S42). After that, the authentication section 31 identifies the staff member (user) through the use of the received user ID and password (step S43).

Figure 15:
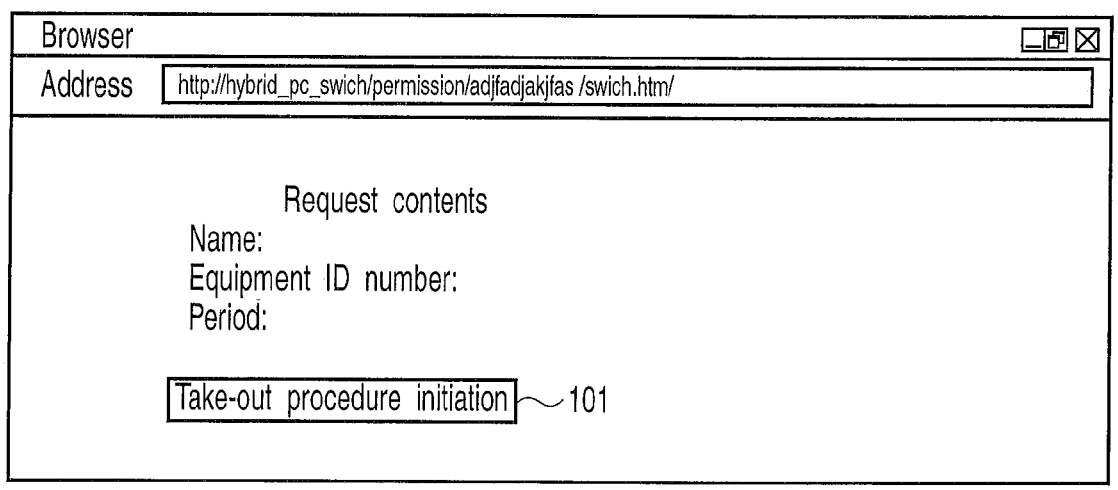
FIG. 15 is an exemplary schematic diagram illustrating a take-out approval confirmation Web page according to the first embodiment.

When the user identity authentication results in success, the Web server 3A sends an approval confirmation login Web page to the browser 52 in the administrator PC 50 (step S44). An example of a take-out approval confirmation Web page displayed by the Web browser 24 is illustrated in FIG. 15. As shown, the take-out approval confirmation Web page has the name of the staff member (requester) and the equipment identification number of the personal computer written on it. On the take-out approval confirmation page is set a take-out processing initiation button 101 for instructing the Web server 3A to perform the take-out processing. When the user presses the take-out processing initiation button 101 (step S45), a take-out processing initiating message is presented to the switching instruction section 40 (step S46). The switching instruction section 40 notifies the administrator by mail that the user has confirmed the PC take-out approval (step S47).

The switching instruction section 40 sends a virtual machine switching message to the configuration information change section 21 in the user's administrative virtual machine 6A (step S48). In this message transmission, a message based on a protocol, such as Simple Object Access Protocol (SOAP), is sent with encryption using Secure Hypertext Transfer Protocol (HTTPS).

Upon receipt of the message, the configuration information change section 21 verifies that the message has been certainly sent from the hybrid PC manager 3 (step S49). When verification results in success, the configuration information change section 21 changes the virtual machine configuration information 23 retained in the administrative virtual machine 6A (step S50). The administrative virtual machine 6A notifies the Web server 3A and the execute permission section 22 that the switching process has been completed (step S51). After that, the execute permission section 22 instructs the administrative virtual machine 6A to shut down the application and the OS which are being executed by the office use virtual machine 6B. When the administrative virtual machine 6A has been shut down, the execute permission section 22 shuts down the administrative virtual machine 6A as well for the time being (step S52).

After that, when the staff member's personal computer is switched on, the administrative virtual machine 6A is started up first and the outside use virtual machine 6C is executed next.

In the above manner, the personal computer take-out request and the switching process are performed. The hybrid PC manager 3 may perform the process of sending the virtual machine switching message (step S48) after the transmission of PC take-out approval mail without obtaining conformation from the user.

When the staff member (user) returns to the company from outside, he or she makes a request for permission to take the personal computer back using a take-back request application installed in the virtual machine 6C. The PC take-back request from the staff member is presented to his or her superior and the administrator and logged. The hybrid PC manager operates the administrative application of the corresponding hybrid PC client to switch the virtual machine available to the staff member from the outside use virtual machine 6C to the office use virtual machine 6B. At this point, the outside use virtual machine used outside the company may be removed for the time being to make provision for the next business trip or to prevent unnecessary information from being brought into the company.

The load of deleting or backing up data can be reduced.

Heretofore, whenever a staff member takes his or her usual personal computer out, it has been required for him or her to delete data in the personal computer or back up it in the server. According to the present invention, the load of deleting or backing up data can be reduced because no confidential information or data is stored in the outside use virtual machine 6C.

According to the present system, illegal copying of data prior to business trip can be prevented. Conventionally, when a staff member takes his or her usual personal computer out, it has been difficult to prevent confidential information or data from being illegally copied into the personal computer before he or she goes out. According to the present invention, since the staff member cannot access the outside use virtual machine 6C when he or she stays in the company, data cannot be copied into the virtual machine 6C before he or she goes out.

The leakage of confidential information due to carelessness can be prevented. Conventionally, when a staff member takes his or her usual personal computer out, there has arisen the possibility of the occurrence of accidents such that confidential information or data is taken out carelessly or leaks out as the result of forgetfulness of its erase. However, the present invention can prevent such accidents because no confidential information or data is stored in the outside use virtual machine 6C.

The present invention can prevent information leakage due to infection with computer viruses or file exchange software. As described previously, the virtual machines are isolated from each other. Therefore, if, when a staff member is out, the outside use virtual machine 6C on which he or she is working is infected with computer viruses, the viruses cannot access data, OS, or applications in the other virtual machine, thus allowing the prevention of information leakage due to infection with computer viruses or file exchange software.

Switching between the virtual machines is implemented through the administrator (system), thus allowing prevention of illegality of users. With conventional PCs installed with virtualization software, staff members (users) can freely switch environments; however, the inventive hybrid PC system does not allow users to freely switch environments (virtual machines). It therefore becomes possible to prevent illegality of staff members (users).

The convenience when a staff member goes out to another department of the same office can be increased. When conventional measures using outside-use-only personal computers (no confidential information) are taken against information leakage to prohibit outside use of usual personal computers, staff members are not allowed to watch past mail or documents created by themselves in places to which they go out, which may interfere with their outside business. When a thin client system is introduced, it is required to access the thin client server from outside at all times, which may cause a problem that response becomes slow depending on network traffic. In contrast to this, in the inventive hybrid PC system, if, when a staff member goes out on business to another department of the same company, he or she connects his or her hybrid PC to the office LAN in that department, he or she will be allowed to use his or her usual virtual machine 6B upon request and directly watch past mail or documents created by himself or herself. This increases the efficiency of outside business.

When the administrator (system) gives approval, part of files in the virtual machine can be referred to by exporting them. The use of this export option allows data that suddenly becomes necessary in a place to which a staff member goes out to be referred to, which eliminates the need of an outside use USB memory.

It is also possible to finely restrict user's operations (browsing, retaining, editing, copying, printing, attaching to mail, etc.) on data allowed to take out and retain a log of operations in the administrative system.

Second Embodiment

Figure 18:
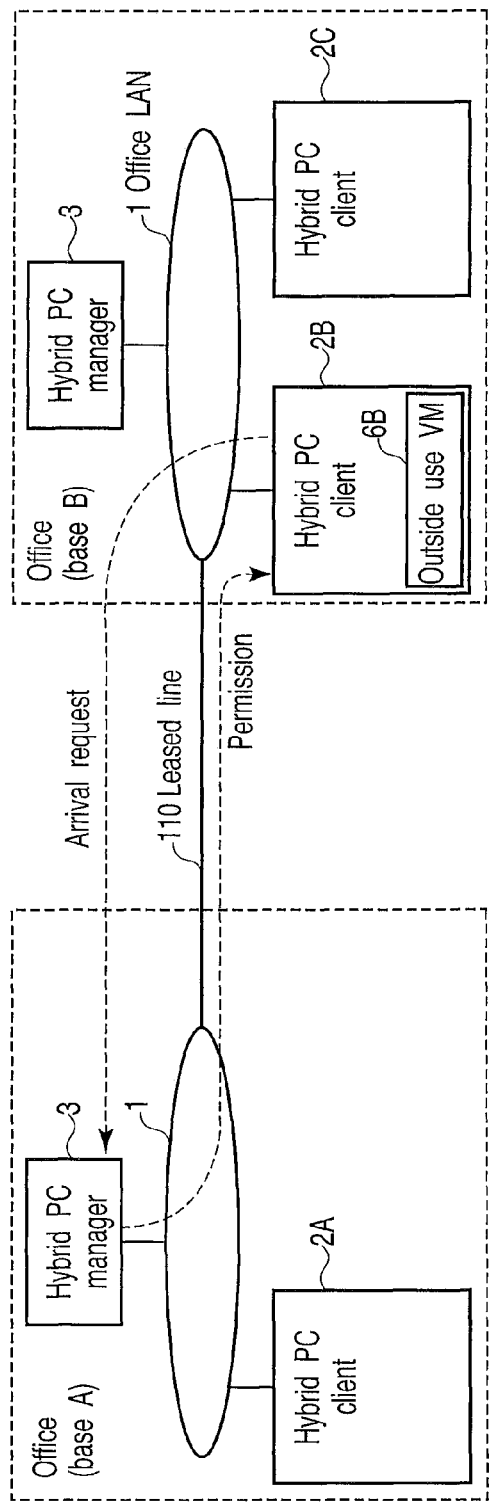
FIG. 18 show an exemplary usage of a hybrid PC system according to a second embodiment.

As shown in FIGS. 16, 17 and 18, the embodiment is configured such that, when a staff member of a company, which has two or more bases (departments) having their respective office LANs 1A and 1B connected together via a leased line 110, goes on a business trip to another department, he or she can make an arrival request to the hybrid PC manager 3 in that department via the office LANs.

As shown in FIG. 16, when the hybrid PC client 2B is connected to the office LAN 1A in the base A, the office use virtual machine 6B is executed. As shown in FIG. 17, when the PC client 2B is taken to outside of the base A, the outside use virtual machine 6C is executed. As shown in FIG. 18, when the office use virtual machine 6B is taken into the base B, the hybrid PC client 2B makes an arrival request to the hybrid PC manager 3 and receives permission, thereby allowing the office virtual machine 6B to be used. When the staff member goes out of the base B, switching can also be made from the office virtual machine 6B to the outside use virtual machine 6C as in the case of the aforementioned PC take-out request.

By so doing, it becomes possible to prevent copying of confidential information or data into the personal computer at home, which may result in information leakage at a later time. Even when a staff member goes on a business trip to another department of the same company, switching can be made from the outside use virtual machine 6C to the office use virtual machine 6B which is usually used by him or her at his or her desk, allowing him or her to directly refer to past mail or documents created by himself or herself. Therefore, business efficiency can be increased.

Figure 19A:
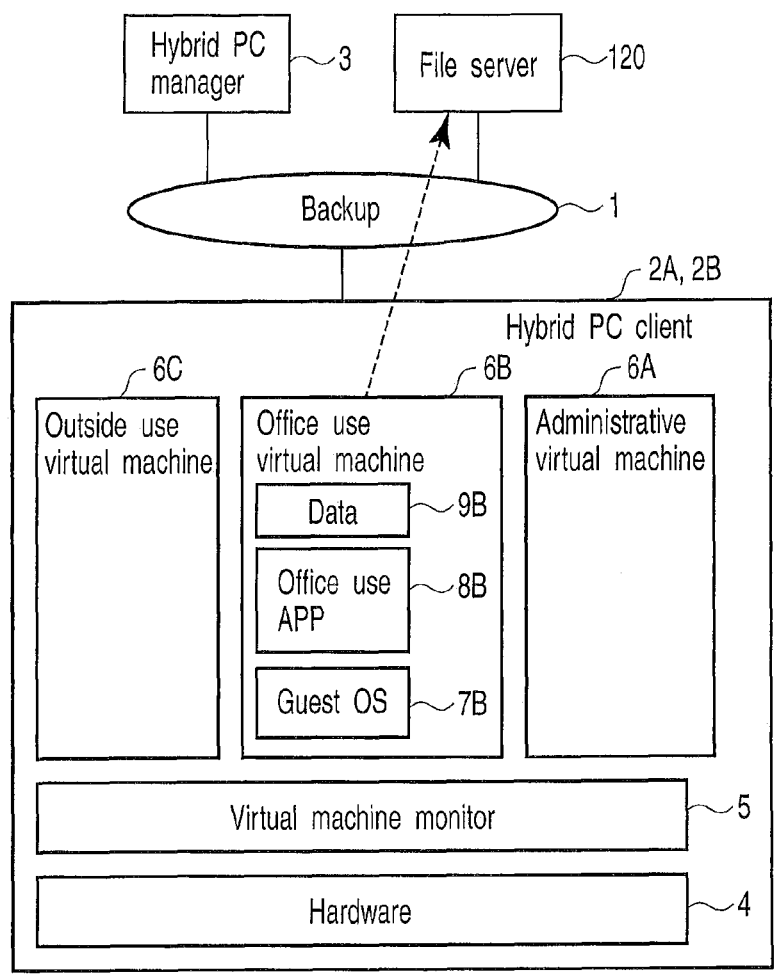
FIG. 19A and FIG. 19B are an exemplary schematic diagram for use in explanation of backup of a virtual machine in a hybrid PC client in the second embodiment.

In addition, as shown in FIG. 19A, the staff member is allowed to instruct virtual machine backup (including movement and replacement) as well as to make a PC take-out request. In this case, image files (OS, applications and data) in the office use virtual machine 6B of the staff member can be backed up in a file server 120 connected to the office LAN in their entirety in conjunction with the aforementioned virtual machine switching.

Figure 19B:
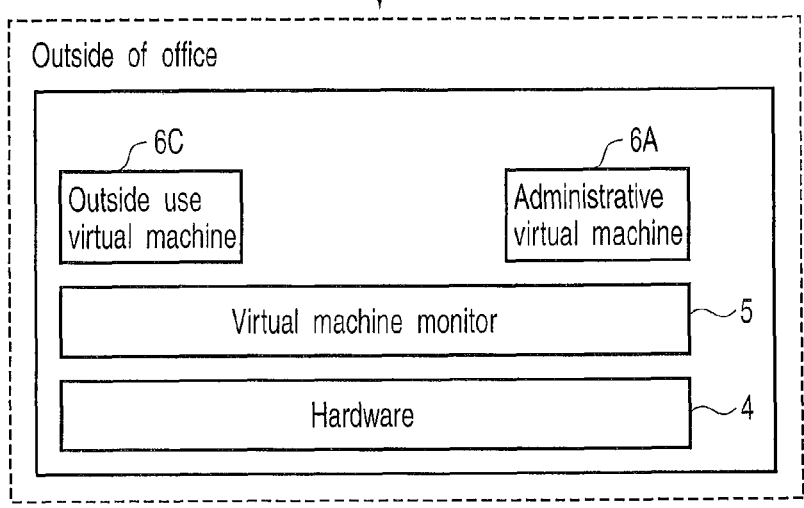

Thus, if the office use virtual machine 6B is moved to the file server 120 as shown in FIG. 19B when the staff member is going out, security will be ensured even if the hybrid PC client 2B is lost or stolen on the way because there is no confidential data in the PC client. Further, even when the office use virtual machine 6B is usually used office, images files in it may be periodically backed up in the file server. In this case, when the staff member goes out, only image files after the last backup are backed up.

Third Embodiment

In some cases, it is required to take a part of files retained in a usually used personal computer to outside of the company as in the case of presentation of products to customers, announcement at scientific societies, etc. Conventionally, in such a case, necessary files have been taken out copied into, for example, a USB memory with programs for encryption, copy inhibition, etc.

With the present hybrid PC system, it is possible to make the above USB memory unnecessary. In addition, the present hybrid PC system is characterized in that, in order to prevent illegal operations of staff members on files taken out, a program for supervising operations on the files runs on the administrative virtual machine which staff members cannot access.

Figure 20:
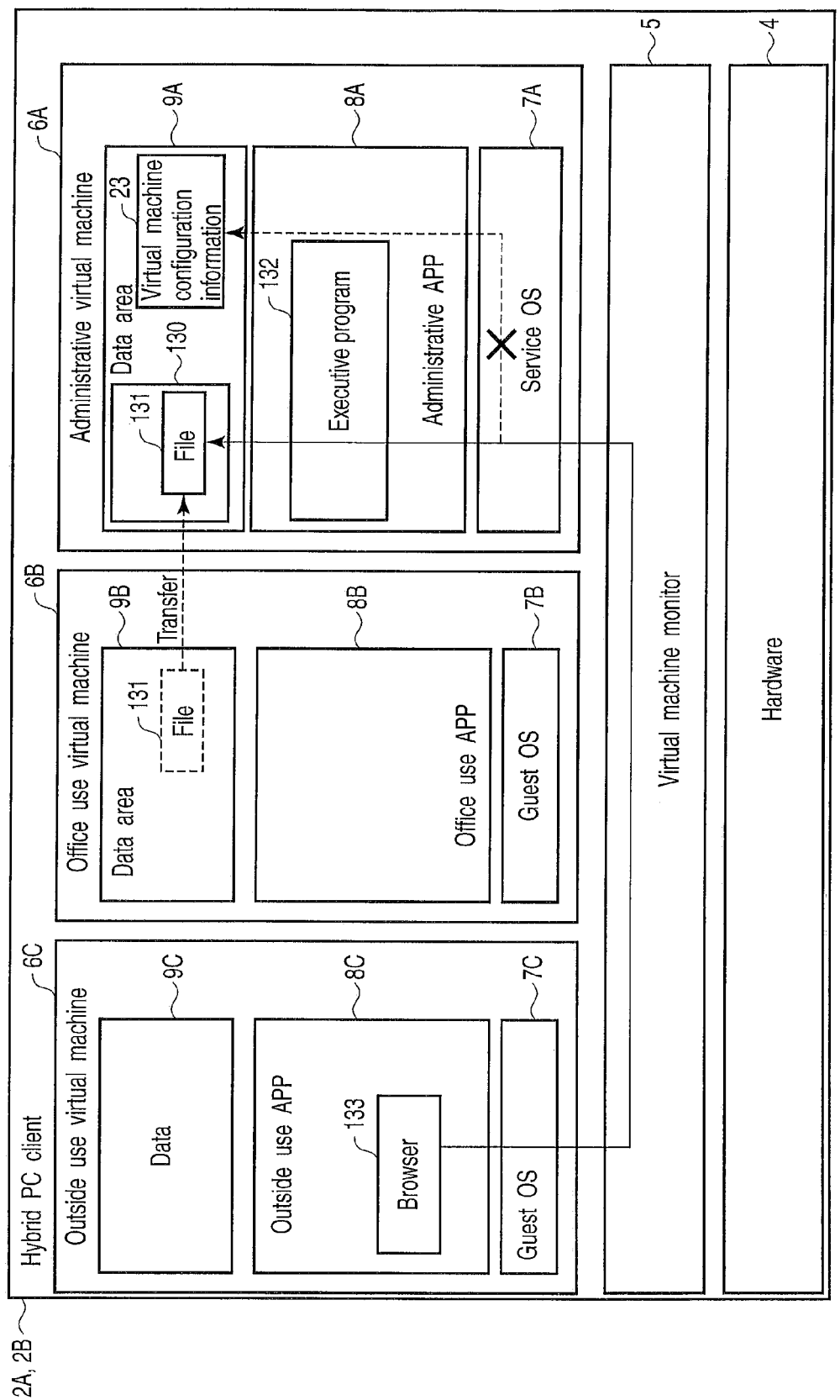
FIG. 20 is an exemplary schematic diagram for use in explanation of file sharing by hybrid PC clients according to a third embodiment.

Hereinafter, the system will be described with reference to FIG. 20, which illustrates take-out control of data using file sharing between virtual machines.

When the user makes a request to the administrator for permission to take a file 131 out and then the request is accepted, the file 131 which resides in the data area 9B of the office use virtual machine 6B is once transferred (copied) into a shared data area 130 in the data area 9A of the administrative virtual machine. When the staff member desires to refer to the file 131 which has been taken out in a state where he or she is using the outside use virtual machine 6C outside the company, he or she refers to the file 131 which resides in the shared data area 130 of the administrative virtual machine using the file sharing facility of the Windows (registered trademark). Thus, the file outflow due to infection with viruses on the outside of the company can be prevented.

The times when the staff member accesses the file 131 taken out are logged by a supervisory program 132 on the administrative virtual machine 6A. Furthermore, the supervisory program 132 can monitor operations of the staff member on the file 131 and finely restrict operations on the file, such as copying, saving, printing, etc. Thus, when operations on the file 131 taken out are monitored by the supervisory program 132 on the administrative virtual machine 6A, illegality can be prevented because the staff member cannot delete the supervisory program at discretion.

The service OS 7A inhibits the outside use virtual machine 6C from making access to data, such as virtual machine configuration information, stored in the data area 9A other than the shared data area 130.

Fourth Embodiment

Hereinafter, a description is given of a method for preventing a computer in which switching between the virtual machines 6B and 6C is not made from being taken outside of the company.

FIG. 21 is a diagram for use in explanation of examination made when a hybrid PC client is being taken out according the fourth embodiment.

As shown in FIG. 21, a checking device 140 connected to the office LAN 1 is set at the gate. In addition, a take-out request record database 141 is set in the hybrid PC manager 3. The database 141 manages the asset or serial numbers of hybrid PC clients which have their respective virtual machines switched on the basis of take-out requests. The asset or serial numbers are attached in bar-code form to computer bodies.

The checking device 140 reads the bar code attached to the hybrid PC client 2B which is being taken out with a bar-code reader to identify its asset or serial number.

The read asset or serial number is checked with the database 141 to determine whether or not switching between virtual machines has been made.

In addition to checking at the gate by a guard using the checking device, a check may be made using a conventional network authentication technique when the PC which has been taken out is connected to the office network in a place where the staff member is on business.

(Modifications)

The embodiments have been described by way of an example of introducing the inventive hybrid system into an enterprise and operating it within that enterprise. However, as shown in FIG. 22, the hybrid PC manager 3 and the file server 120 may be placed on the Internet 150 to provide ASP services, for small and medium-sized enterprises. With such ASP (application service provider) services, the services can be utilized at once without introducing facilities, such as a server and the like.

Even with an enterprise which is not able to introduce a server at once, the introduction of the hybrid PC services allows measures against information leakage due to take-out of personal computers to be taken at once.

In addition, as shown in FIG. 23, various virtual machine image files (OS, applications, data) 161, 162 and 163 may be placed on the file server 120 to fit various uses. In this case, a virtual machine image file is selected to fit the demand or contract of a subscriber and then downloaded to the hybrid PC client 2.

For example, in an Internet café, the hybrid PC client 2 having an administrative virtual machine 160A and a virtual machine 160B is installed.

When the hybrid PC client 2 is started, the virtual machine 160B is executed. The user operates the virtual machine 160B to notify the hybrid PC manager 3 of the virtual machine image files 161, 162 and 163 to be downloaded. The hybrid PC manager 3 communicates with the administrative application operating on the administrative OS of the administrative virtual machine 160A to instruct it to receive the virtual machine image files and switch between the virtual machines. Upon reception of the virtual machine image files, the administrative application of the administrative virtual machine 160A terminates the virtual machine 160B and executes the received virtual machine image files as a virtual machine 160C.

As described above, switching can be made to a virtual machine received from the filer server 120 as requested by the user. The virtual machine image of the hybrid PC client may be deleted upon completion of the execution of the virtual machine.

For example, the user notifies the hybrid PC manager 3 of the completion of execution of the virtual machine 160C using an application in the virtual machine 160C. The hybrid PC manager 3 then instructs the administrative application of the administrative virtual machine 160A to delete the image file. The administrative application then deletes the image files of the virtual machine 160C. The administrative application of the administrative virtual machine 160A may sends the image files of the virtual machine 160C to the file server 120 before they are deleted.

In addition, virtual machine images installed with applications adapted for particular industries may be prepared and provided to users on a monthly contract basis.

Furthermore, utilization of the hybrid PC client of the invention in an Internet café will allow an available application to be selected as requested by a user. When a change is made from that user to another, the history and data of the former user can be deleted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus configured to execute one of an office use virtual machine and an outside use virtual machine which are operate on a virtual machine monitor, the office use virtual machine being not allowed to access the outside use virtual machine, the outside use virtual machine being not allowed to access the office use virtual machine, and the office use virtual machine being not allowed to output data to an external device, apparatus comprising:
    an activating section configured to operate on the virtual machine monitor, and to activate one of the office use virtual machine and the outside use virtual machine based on activation information;
    a communication module configured to operate on the virtual machine monitor, and to communicate to administrative server over a network; and
    a changing section configured to change the activation information in response to an instruction from the administrative server.

2. The information processing apparatus according to claim 1;
    wherein the communication module is a take-out request section for requesting of the administrative server a take-out of the information processing apparatus;
    wherein the changing section changes activation information indicating the office use virtual machine to activation information indicating the outside use virtual machine when a reply has been transmitted that permits the takeout of the information processing apparatus from the administrative server; and
    wherein the activating section activates the outside use virtual machine after the office use virtual machine has been shut down.

3. The information processing apparatus according to claim 2, wherein the takeout request section has an initiating message transmission section for transmitting a message of initiation of takeout processing to the administrative server when a take-out processing initiation button is pressed, the take-out processing initiation button being handled on the office use virtual machine and displayed on a take-out approval confirmation login Web page created by the administrative server.

4. The information processing apparatus according to claim 1:
    wherein the communication module is a take-back request section for requesting of the administrative server a take-back of the information processing apparatus;
    wherein the changing section changes activation information indicating the office use virtual machine to activation information indicating the outside use virtual machine when a reply has been transmitted that permits the take-back of the information processing apparatus from the administrative server; and
    wherein the activating section shuts down the outside use virtual machine and activates the office use virtual machine.

5. The information processing apparatus according to claim 1;
    wherein the network comprises a first office LAN and a second office LAN that is not directly connected to the first office LAN;
    wherein the administrative server is connected to the first office LAN; and
    wherein the information processing apparatus further comprises a transmission section that transmits a switching request to the administrative server, the switching request being made to switch the outside use virtual machine to the office use virtual machine, when the information processing apparatus has been connected to the second office LAN.

6. The information processing apparatus according to claim 5;
    wherein the switching request is a destination arrival request;
    wherein the changing section changes activation information indicating the office use virtual machine to activation information indicating the outside use virtual machine when the administrative server permits switching the outside use virtual machine to the office use virtual machine;
    wherein the activating section activates the office use virtual machine after the outside use virtual machine has been shut down.

7. The information processing apparatus according to claim 1;
    wherein an administrative virtual machine operates on the virtual machine monitor; and
    wherein the administrative virtual machine has a common data region accessible from the office use virtual machine and the outside use virtual machine.

8. The information processing apparatus according to claim 1;
    wherein the network includes the internet;
    wherein the administrative server is provided on the internet and has image files of a plurality of virtual machines; and
    wherein the information processing apparatus further comprises a means for downloading from the administrative server an image file of a virtual machine associated with a contract of a subscriber using the information processing apparatus.

9. An information processing system comprising an administrative server configured to send a virtual machine switching instruction over a network and an information processing apparatus which is connected to the administrative server via the network, the apparatus configured to execute one of an office use virtual machine and an outside use virtual machine which are operated on a virtual machine monitor, the office use virtual machine being not allowed to access the outside use virtual machine, the outside use virtual machine being not allowed to access the office use virtual machine, and the office use virtual machine being not allowed to output data to an external device, wherein the apparatus comprises:

an activating section configured to operated on the virtual machine monitor, and to activate one of the office use virtual machine and the outside use virtual machine based on based on activation information; and an activation information changing section configured to operate in the virtual machine monitor, to communicate to administrative server over a network, and to change the activation information in response to the switching instruction.

10. The information processing system according to claim 9;

wherein the information processing apparatus is a take-out request section for requesting of the administrative server a takeout of the information processing apparatus;

wherein the changing section changes activation information indicating the office use virtual machine to activation information indicating the outside use virtual machine when a reply has been transmitted that permits the takeout of the information processing apparatus from the administrative server; and wherein the activating section activates the outside use virtual machine after the office use virtual machine has been shut down.

11. The information processing system according to claim 10;

wherein the information processing apparatus has an initiating message transmission section for transmitting a message of initiation of takeout processing to the administrative server when a take-out processing initiation button is pressed, the take-out processing initiation button being handled on the office use virtual machine and displayed on a take-out approval confirmation login Web page created by the administrative server; and wherein the administrative server has Web page creating means for creating the approval confirmation login Web page.

12. The information processing system according to claim 9:

wherein the communication module is a take-back request section for requesting of the administrative server a take-back of the information processing apparatus;

wherein the changing section changes activation information indicating the office use virtual machine to activation information indicating the outside use virtual machine when a reply has been transmitted that permits the take-back of the information processing apparatus from the administrative server; and wherein the activating section shuts down the outside use virtual machine and activates the office use virtual machine.

13. The information processing system according to claim 9:

wherein the administrative server has a database managing an information processing apparatus which has switched the office use virtual machine to the outside use virtual machine; and wherein the information processing system further comprises a checking device for checking whether the office use virtual machine has been switched to the outside use virtual machine based on the database.

14. The information processing system according to claim 9;

wherein an administrative virtual machine operates on the virtual machine monitor; and wherein the administrative virtual machine has a common data region accessible from the office use virtual machine and the outside use virtual machine.

15. The information processing system according to claim 9;

wherein the network comprises a first office LAN and a second office LAN that is not directly connected to the first office LAN;

wherein the administrative server is connected to the first office LAN; and wherein the information processing apparatus further comprises a transmission section that transmits a switching request to the administrative server, the switching request being made to switch the outside use virtual machine to the office use virtual machine, when the information processing apparatus has been connected to the second office LAN.

16. The information processing system according to claim 15;

wherein the switching request is a destination arrival request;

wherein the changing section changes activation information indicating the office use virtual machine to activation information indicating the outside use virtual machine when the administrative server permits switching the outside use virtual machine to the office use virtual machine;

wherein the activating section activates the office use virtual machine after the outside use virtual machine has been shut down.

17. The information processing system according to claim 9;

wherein the network includes the internet;

wherein the administrative server is provided on the internet and has image files of a plurality of virtual machines; and wherein the information processing apparatus further comprises a means for downloading from the administrative server an image file of a virtual machine associated with a contract of a subscriber using the information processing apparatus.

* * * * *